United States Patent
Yu et al.

(10) Patent No.: US 8,036,326 B2
(45) Date of Patent: Oct. 11, 2011

(54) APPARATUS AND METHOD FOR CANCELLING INTERFERENCES BETWEEN ORTHOGONAL CODED SIGNALS IN MOBILE COMMUNICATION SYSTEM

(75) Inventors: Donghun Yu, Seoul (KR); Jun Jin Kong, Yongin-si (KR); Sung Chung Park, Daejeon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 699 days.

(21) Appl. No.: 12/155,395

(22) Filed: Jun. 3, 2008

(65) Prior Publication Data

US 2009/0122929 A1     May 14, 2009

(30) Foreign Application Priority Data

Nov. 12, 2007  (KR) .................. 10-2007-0115124

(51) Int. Cl.
*H04L 25/08* (2006.01)
*H04L 1/02* (2006.01)

(52) U.S. Cl. .................. 375/346; 375/347
(58) Field of Classification Search .......... 375/346, 375/148, 341, 316, 347, 267, 285
See application file for complete search history.

(56) References Cited

U.S. PATENT DOCUMENTS

| | | | | |
|---|---|---|---|---|
| 5,294,933 A * | 3/1994 | Lee et al. | ...................... | 342/159 |
| 2003/0068994 A1 | 4/2003 | Sayeed et al. | | |
| 2005/0276313 A1 | 12/2005 | Horneman et al. | | |
| 2006/0050655 A1 | 3/2006 | Shi et al. | | |
| 2007/0291882 A1 * | 12/2007 | Park et al. | ...................... | 375/347 |
| 2008/0095257 A1 * | 4/2008 | Maeda et al. | ................. | 375/262 |
| 2009/0028265 A1 * | 1/2009 | Lee et al. | ...................... | 375/267 |
| 2010/0124299 A1 * | 5/2010 | Ogawa et al. | ................. | 375/316 |
| 2010/0124301 A1 * | 5/2010 | Bahng et al. | ................. | 375/341 |
| 2010/0150279 A1 * | 6/2010 | Arar | ............................ | 375/340 |
| 2010/0232549 A1 * | 9/2010 | Oizumi | ........................ | 375/341 |

FOREIGN PATENT DOCUMENTS

| | | |
|---|---|---|
| JP | 2006-339773 | 12/2006 |
| KR | 1020040014542 | 2/2004 |
| KR | 1020050065499 | 6/2005 |
| KR | 100659281 | 12/2006 |
| KR | 1020060132045 | 12/2006 |

* cited by examiner

*Primary Examiner* — Tesfaldet Bocure
(74) *Attorney, Agent, or Firm* — Harness, Dickey & Pierce, P.L.C.

(57) ABSTRACT

Apparatuses and methods for cancelling interferences between signals are provided. The apparatuses includes: a receiving unit that receives an orthogonal coded signal from a transmitter and generates a received vector; a channel estimation unit that estimates a state of a wireless channel from the transmitter to the apparatus where the cancelling of the interference between signals is performed and generates a channel state matrix; a Q-R decomposition unit that performs Q-R decomposition with respect to the generated channel state matrix and generates a Q matrix and an R matrix, and generates a decision statistic vector based on the generated Q matrix and the received vector; and a signal determination unit that determines a received signal with interference from the orthogonal coded signal being decreased based on the generated decision statistics vector.

17 Claims, 5 Drawing Sheets

APPARATUS AND METHOD FOR CANCELLING INTERFERENCES BETWEEN ORTHOGONAL CODED SIGNALS IN MOBILE COMMUNICATION SYSTEM

PRIORITY STATEMENT

This application claims priority from Korean Patent Application No. 10-2007-0115124, filed on Nov. 12, 2007, in the Korean Intellectual Property Office (KIPO), the entire contents of which are incorporated herein by reference.

BACKGROUND

1. Field

Example embodiments relate to apparatuses and methods for receiving a signal being transmitted using a transmission diversity scheme in a mobile communication system, and more particularly to apparatuses and methods that can increase reception performance by cancelling interferences between orthogonal coded signals.

2. Description of Related Art

With rapid development of mobile telecommunication systems, a served amount of data provided by a mobile telecommunication system rapidly increases. A channel state of a wireless link between a base station and a terminal of the mobile telecommunication system changes over time, and this is referred to as a fading phenomenon.

In the case of high-speed data transmission in the mobile telecommunication system, an amplitude and a phase of a received signal is distorted due to the fading phenomenon occurring on the wireless channel.

The fading phenomenon occurs on the wireless link in between the base station and the terminal, and is one of the main reasons that service quality of the mobile telecommunication system deteriorates.

Various diversity schemes are used to overcome the fading phenomenon. As an instance of the various diversity schemes, a space diversity scheme using a plurality of antennas which are spaced from each other over a predetermined distance is used. A reception diversity scheme receiving a transmitted signal using a plurality of antennas is difficult to be applied to a downlink in a mobile communication environment due to a limited size of a terminal. Accordingly, research and development with respect to a transmission diversity scheme that transmits a signal using a plurality of antennas has been conducted. An orthogonal coding scheme, one type of transmission diversity schemes, encodes a plurality of data to transmit in a transmitter, generates a plurality of data streams being orthogonal with each other, and transmits the generated data streams to a receiving apparatus using a plurality of time durations or a plurality of frequency bands.

SUMMARY

Example embodiments may provide apparatuses and methods that increase performance of receiving apparatuses by cancelling interferences between a plurality of signals being transmitted from a plurality of transmission antennas of a transmitter.

Also, example embodiments may provide apparatuses and methods that increase performance of receiving apparatuses by cancelling interferences between orthogonal coded signals.

According to example embodiments, apparatuses for cancelling interferences between signals includes: a receiving unit that receives an orthogonal coded signal from a transmitter and generates a received vector; a channel estimation unit that estimates a state of a wireless channel from the transmitter to the apparatus where the cancelling of the interference between signals is performed and generates a channel state matrix; a Q-R decomposition unit that performs Q-R decomposition with respect to the generated channel state matrix and generates a Q matrix and an R matrix, and generates a decision statistic vector based on the generated Q matrix and the received vector; and a signal determination unit that determines a received signal with interference being decreased from the orthogonal coded signal based on the generated decision statistics vector.

According to example embodiments, a method for cancelling interferences between signals includes: receiving an orthogonal coded signal from a transmitter and generating a received vector; estimating a state of a wireless channel from the transmitter to the apparatus for cancelling interferences between signals and generating a channel state matrix; performing Q-R decomposition with respect to the generated channel state matrix and generating a Q matrix and an R matrix; generating a decision statistic vector based on the generated Q matrix and the received vector; and determining a received signal with interference being decreased from the orthogonal coded signal based on the generated decision statistics vector.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Example embodiments will now be described more fully with reference to the accompanying drawings. Embodiments, however, may be embodied in many different forms and should not be construed as being limited to example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," or "coupled to" to another component, it may be directly on, connected to, or coupled to the other component or intervening components may be present. In contrast, when a component is referred to as being "directly on," "directly connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
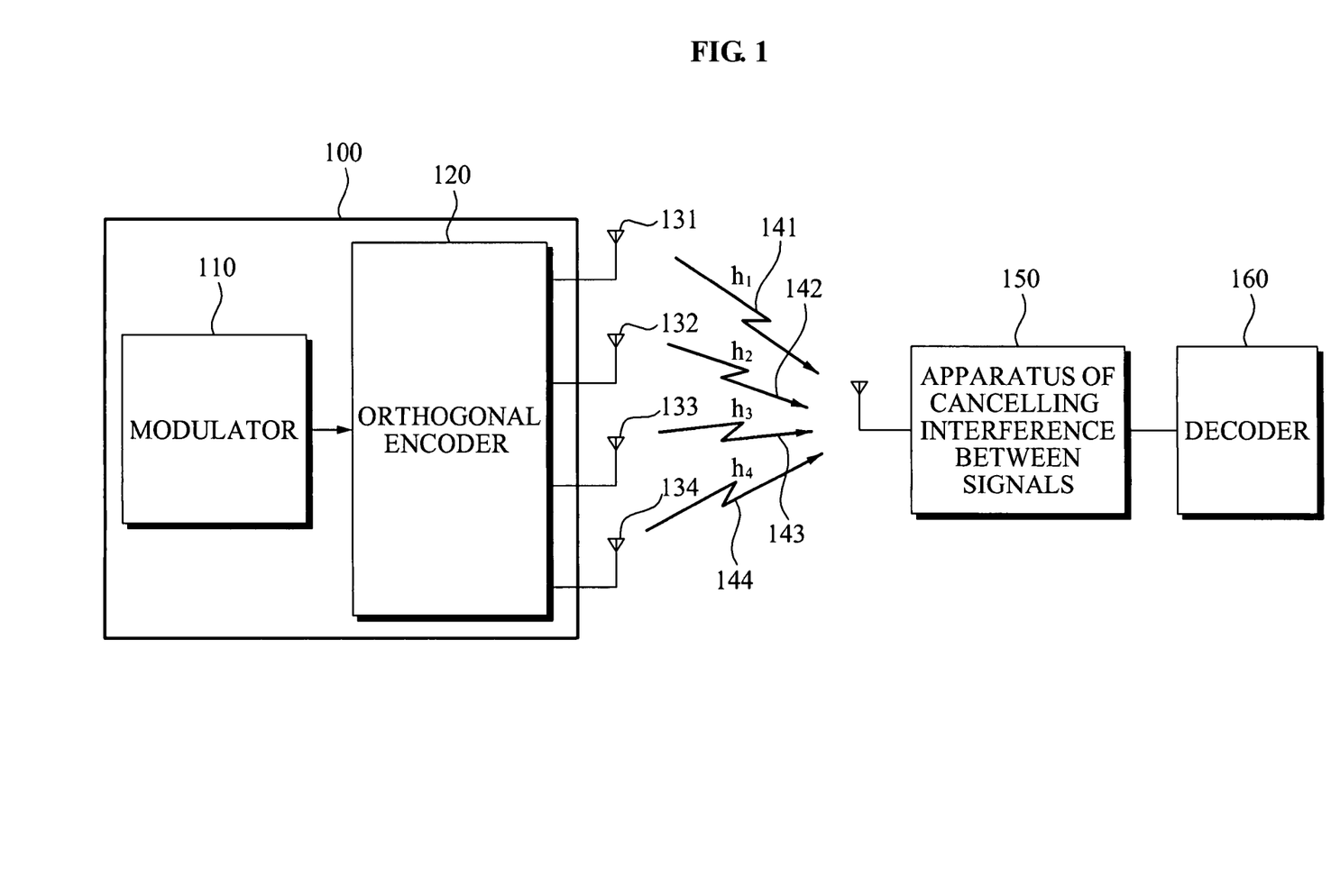
FIG. 1 illustrates a concept of receiving an orthogonal coded signal using an apparatus for cancelling interferences between signals according to an example embodiment of the present invention.

FIG. 1 illustrates a concept of receiving an orthogonal coded signal using an apparatus 150 for cancelling interferences between signals according to an example embodiment of the present invention. Hereinafter, the concept of receiving the orthogonal coded signal using the apparatus 150 for cancelling interferences between signals will be described in detail with reference to FIG. 1.

A modulator 110 of a transmitter 100 modulates data which will be transmitted to an apparatus 150 for cancelling interferences between signals in the transmitter 100 to generate a transmission signal. An orthogonal encoder 120 performs orthogonalization with respect to the modulated signal being modulated in the encoder 110, and generates a plurality of signals being orthogonal with each other. The orthogonalized plurality of signals are transmitted to the apparatus 150 for cancelling interferences between signals via a plurality of transmission antennas 131, 132, 133, and 134. The transmitter 100 including four transmission antennas 131, 132, 133, and 134 is illustrated in FIG. 1, however according to another embodiment of the present invention, two or eight transmission antennas can be established in the transmitter 100.

The orthogonal encoder 120 orthogonalizes a plurality of data that will be transmitted via a plurality of time durations in the transmitter 100. The orthogonal encoder 120 generates a plurality of signals which can be transmitted using the plurality of time durations in each of the plurality of transmission antennas 131, 132, 133, and 134. The plurality of signals are orthogonal with each other unless states of wireless channels (141, 142, 143, and 144) are changed from the each of the plurality of transmission antennas 131, 132, 133, and 134 to the apparatus 150 for cancelling interferences between signals.

Sizes and phases of the plurality of signals being transmitted from the plurality of transmission antennas 131, 132, 133, and 134 are distorted while passing through wireless channels 141, 142, 143, and 144.

Actual states of the wireless channels 141, 142, 143, and 144 are changed over time due to a fading phenomenon. Since the orthogonal coded signals being orthogonalized in the orthogonal encoder 120 are transmitted via a plurality of time durations, the channel states of the wireless channels 141, 142, 143, and 144 are changed during the transmission of the signals. Therefore, orthogonality between the plurality of the orthogonal coded signals cannot be maintained.

Due to the fading phenomenon, the signals transmitted via each of the transmission antennas 131, 132, 133, and 134 are no longer orthogonal to each other. Therefore, interference occurs between the signals being transmitted via each of the transmission antennas 131, 132, 133, and 134. Due to the inference occurring between the signals being transmitted via each of the transmission antennas 131, 132, 133, and 134, performance of the apparatus 150 for cancelling interferences between signals is deteriorated.

The apparatus 150 for cancelling interferences between signals cancels the interference between signals occurring due to the fading phenomenon of the wireless channels 141, 142, 143, and 144.

Figure 2:
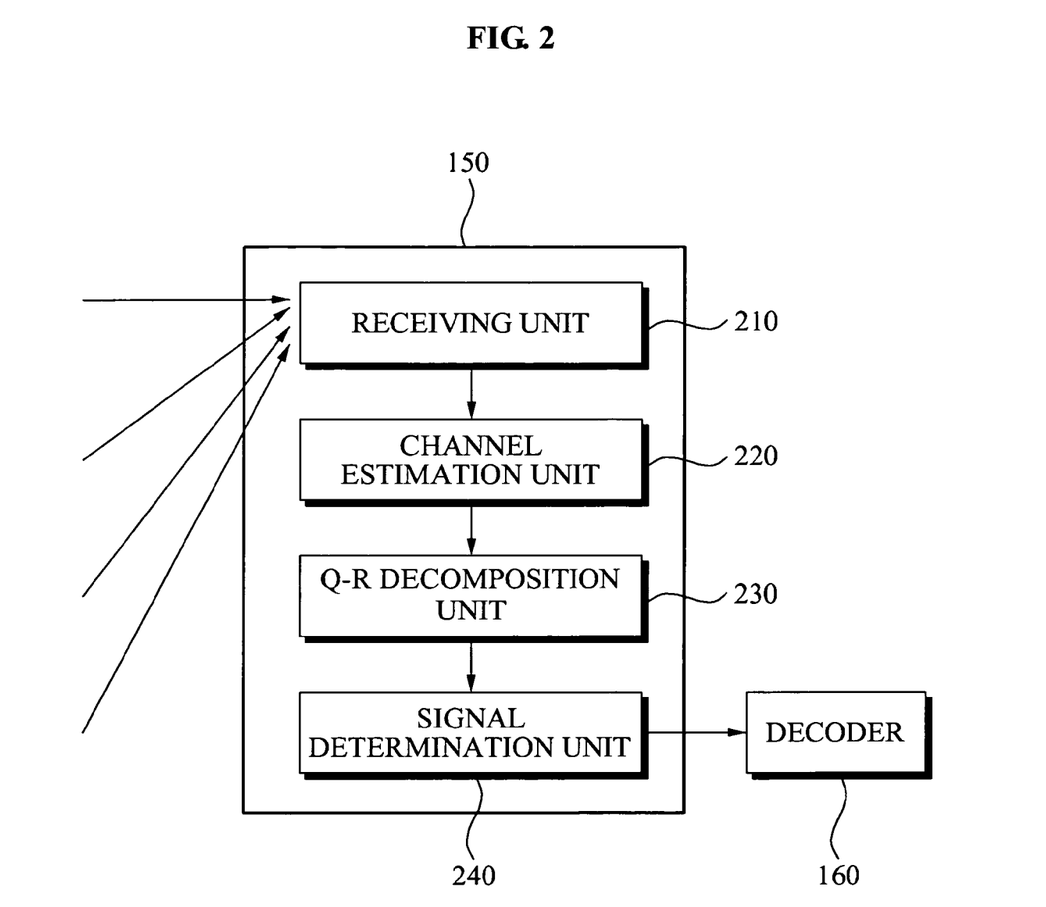
FIG. 2 is a block diagram illustrating a structure of an apparatus for cancelling interferences between signals according to an example embodiment of the present invention.

FIG. 2 is a block diagram illustrating a structure of an apparatus 150 for cancelling interferences between signals according to an example embodiment of the present invention. Hereinafter, the apparatus 150 for cancelling interferences between signals will be described in detail with reference to FIG. 2. The apparatus 150 for cancelling interferences between signals includes a receiving unit 210, a channel estimation unit 220, a Q-R decomposition unit 230, and a signal determination unit 240.

The receiving unit 210 receives an orthogonal coded signal from a transmitter and generates a received vector.

According to an embodiment of the present invention, the orthogonal coded signal received in the receiving unit 210 may be an orthogonal space-time block coded signal or an orthogonal space-frequency block coded signal. The orthogonal space-time block coded signal is transmitted to the apparatus 150 for cancelling interferences between signals via a plurality of time durations, and the orthogonal space-frequency block coded signal is transmitted to the apparatus 150 for cancelling interferences via frequency bands. The receiving unit 210 generates the received vector, the received vector having a signal received at each time duration as an element or having a signal received at each frequency band as an element.

The channel estimation unit 220 estimates a state of a wireless channel from the transmitter to the apparatus 150 for cancelling interferences between signals and generates a channel state matrix. Since the transmitter has a plurality of transmission antennas, the wireless channel from the transmitter to the apparatus 150 for cancelling interferences is a vector channel, and a number of elements of vector channel is equal to the number of antennas of the transmitter.

A vector channel is generated in each of the plurality of time durations or in each of the plurality of frequency bands according to an orthogonal coded scheme. The channel state generated by the channel estimation unit 220 is a type of a matrix. When the transmitter transmits the orthogonal space-time block coded signal, a size of the channel state matrix is determined according to a number of the plurality of time durations and a number of the plurality of transmission antennas. Also, when the transmitter transmits the orthogonal space-frequency block coded signal, a size of the channel state matrix is determined according to a number of the plurality of frequency bands and a number of the transmission antennas.

According to an embodiment of the present invention, the transmitter can have four transmission antennas and perform orthogonal space-time block coding using a $g_4$ code. The $g_4$ code is representative of an orthogonal space-time block code that can be used in the case of four transmission antennas. Hereinafter, a transmitter performing orthogonal space-time block coding using the four transmission antennas and a $g_4$ code will be described. In this instance, a channel state matrix generated in the channel estimation unit 220 is determined as shown in Equation 1.

$$H = \begin{bmatrix} h_1(0) & h_2(0) & h_3(0) & h_4(0) \\ h_2(1) & -h_1(1) & h_4(1) & -h_3(1) \\ h_3(2) & -h_4(2) & -h_1(2) & h_2(2) \\ h_4(3) & h_3(3) & -h_2(3) & -h_1(3) \\ h_1^*(4) & h_2^*(4) & h_3^*(4) & h_4^*(4) \\ h_2^*(5) & -h_1^*(5) & h_4^*(5) & -h_3^*(5) \\ h_3^*(6) & -h_4^*(6) & -h_1^*(6) & h_2^*(6) \\ h_4^*(7) & h_3^*(7) & -h_2^*(7) & -h_1^*(7) \end{bmatrix},$$ [Equation 1]

where $h_k(n)$ indicates a state of a wireless channel from a $k^{th}$ transmission antenna of a transmitter in an $(n+1)^{th}$ time duration to an apparatus for cancelling interferences between signals. An $i^{th}$ column of Equation 1 indicates a state of a wireless channel when the signal from the transmitter passes through eight time durations. When the $g_4$ code is used, a signal is transmitted from each transmission antenna via the eight time durations.

When there is no fading phenomenon, a state of a wireless channel is constant regardless of time. In this instance, since wireless channel can be represented as $h_k(n)=h_k(n+1)$, each column of a channel state matrix is orthogonal with each other. However, in an actual wireless channel of a mobile communication system, each column of the channel matrix is not orthogonal with each other due to the fading phenomenon.

According to the embodiment of the present invention, a plurality of transmission antennas of a transmitter transmits a plurality of pilot signals being orthogonal with each other to the apparatus 150 for cancelling interferences between signals, and the channel estimation unit 220 generates a channel state matrix based on the plurality of pilot signals transmitted from the plurality of transmission antennas of the transmitter.

According to the embodiment of the present invention, when a state of a wireless channel is as shown in Equation 1, a received vector being received in the receiving unit 210 is determined based on Equation 2.

$$r_{received} = H \cdot s + w,$$ [Equation 2]

where $r_{received}$ is a received vector, and H indicates a channel state matrix which is established in the channel estimation unit 220. s is a vector consisting of signals transmitted from a transmitter and is determined based on Equation 3, and w is a thermal noise vector that occurs when the signals are received and is determined based on Equation 4.

$$s = [s_0\ s_1\ s_2\ s_3]^T,$$ [Equation 3]

where $s_k$ is a signal transmitted from a $k+1^{th}$ transmission antenna of a transmitter.

$$w = [w_1\ w_2\ w_3\ w_4\ w_5^*\ w_6^*\ w_7^*\ w_8^*]^T$$ [Equation 4]

where $w_m$ is a thermal noise element occurring when a signal is received in an $m^{th}$ time duration, and $w_m^*$ is a complex conjugate of the thermal noise occurring in the $m^{th}$ time duration.

The Q-R decomposition unit 230 performs Q-R decomposition with respect to the channel state matrix generated in the channel estimation unit 220 and generates a Q matrix and an R matrix. The Q-R decomposition unit 230 generates a decision statistic vector based on the generated Q matrix and the received vector.

With regard to the performing of the Q-R decomposition, a given matrix is decomposed into the Q matrix of a unitary matrix and the R matrix of an upper triangular matrix.

According to an embodiment of the present invention, the Q-R decomposition unit 230 generates the Q-matrix and R-matrix using a modified Gram-Schmidt orthogonalization process.

The Q-R decomposition unit 230 generates the decision statistic vector based on the generated Q matrix and the received vector. According to an embodiment of the present invention, the Q-R decomposition unit 230 multiplies a conjugate transpose matrix of the generated Q matrix by the received vector, and generates the decision statistics vector. The decision statistic vector is determined based on Equation 5.

$$\begin{aligned} r_{QRD} &= Q^H \cdot r_{received} \\ &= Q^H \cdot (H \cdot s + w) \\ &= Q^H \cdot (Q \cdot R \cdot s + w) \\ &= R \cdot s + w_{QRD} \\ &= \begin{bmatrix} R_{11} & R_{12} & R_{13} & R_{13} \\ 0 & R_{22} & R_{23} & R_{24} \\ 0 & 0 & R_{33} & R_{34} \\ 0 & 0 & 0 & R_{44} \end{bmatrix} \cdot s + w_{QRD}, \end{aligned}$$ [Equation 5]

where $r_{QRD}$ indicates a decision statistic vector generated by the Q-R decomposition unit 230, and satisfies $r_{QRD}=[r_{QRD}(0)\ r_{QRD}(1)\ r_{QRD}(2)\ r_{QRD}(3)]^T$. T indicates a transpose matrix. $Q^H$ indicates a conjugate transpose matrix of a Q matrix, and $w_{QRD}$ is a vector generated by multiplying a thermal vector W by the conjugate matrix of the Q matrix.

The signal determination unit 240 determines a received signal from the orthogonal coded signal based on the generated decision statistics vector.

According to the embodiment of the present invention, the signal determination unit 240 can determine an interference contaminated received signal which includes interferences between a plurality of signals being transmitted from a plurality of transmission antennas of a transmitter.

$$\hat{s}_3 = \underset{\bar{s} \in C}{\arg\min} |r_{QRD}(3) - R_{44} \cdot \bar{s}|^2, \quad \text{[Equation 6]}$$

where $R_{44}$ is an element of a $4^{th}$ column of a $4^{th}$ row of an R matrix, and C is a set of all values $\bar{s}$ can have, for example, when a transmission signal is modulated using a binary phase shift keying (BPSK) modulation scheme, C={−1,1} is satisfied.

According to an embodiment of the present invention, the signal determination unit 240 determines each of interference contaminated received signals $\hat{s}_2$, $\hat{s}_1$, and $\hat{s}_0$ of signals transmitted from each of $3^{rd}$, $2^{nd}$, and $1^{st}$ transmission antennas as shown in Equations 7, 8, and 9.

$$\hat{s}_2 = \underset{\bar{s} \in C}{\arg\min} |r_{QRD}(2) - R_{34} \cdot \hat{s}_3 - R_{33} \cdot \bar{s}|^2 \quad \text{[Equation 7]}$$

$$\hat{s}_1 = \underset{\bar{s} \in C}{\arg\min} |r_{QRD}(1) - R_{23} \cdot \hat{s}_2 - R_{24} \cdot \hat{s}_3 - R_{22} \cdot \bar{s}|^2 \quad \text{[Equation 8]}$$

$$\hat{s}_0 = \underset{\bar{s} \in C}{\arg\min} |r_{QRD}(0) - R_{12} \cdot \hat{s}_1 - R_{13} \cdot \hat{s}_2 - R_{14} \cdot \hat{s}_3 - R_{11} \cdot \bar{s}|^2 \quad \text{[Equation 9]}$$

According to an embodiment of the present invention, the signal determination unit 240 determines received signals with decreased interference from among plurality of signals transmitted from the plurality of transmission antennas of the transmitter based on the determined interference contaminated received signals.

According to an embodiment of the present invention, the signal determination unit 240 multiplies a matrix with diagonal elements of an R matrix being deleted by the determined interference contaminated received signal and generates the interference vector between signals. According to an embodiment of the present invention, the signal determination unit 240 generates the interference vector between signals based on Equation 10.

$$s_{int} = \Phi_{IE} \cdot \hat{s}, \quad \text{[Equation 10]}$$

where $s_{int}$ is an interference vector between signals, and $\Phi_{IE}$ is a matrix with diagonal elements of an R matrix being deleted and is represented as shown in Equation 11. $\hat{s}$ is a vector consisting of interference contaminated received signals $\hat{s}_0$, $\hat{s}_1$, $\hat{s}^2$, and $\hat{s}_3$ and is represented as shown in Equation 12.

$$\Phi_{IE} = \begin{bmatrix} 0 & R_{12} & R_{13} & R_{13} \\ 0 & 0 & R_{23} & R_{24} \\ 0 & 0 & 0 & R_{34} \\ 0 & 0 & 0 & 0 \end{bmatrix} \quad \text{[Equation 11]}$$

$$\hat{s} = [\hat{s}_0 \; \hat{s}_1 \; \hat{s}_2 \; \hat{s}_3]^T \quad \text{[Equation 12]}$$

According to an embodiment of the present invention, the signal determination unit 240 performs subtraction operations with respect to the decision statistics vector and the generated interference vector between signals, and determines the received signal.

According to an embodiment of the present invention, the signal determination unit 240 determines the received signal based on Equation 13.

$$\tilde{s}_k = \underset{\bar{s} \in C}{\arg\min} |r_{QRD}(k) - s_{int}(k) - R_{k+1,k+1} \cdot \bar{s}|^2, \quad \text{[Equation 13]}$$

where $\tilde{s}_k$ is a received signal being transmitted from a $(k+1)^{th}$ transmission antenna of a transmitter and is a signal, with interference being decreased, from among a plurality of signals transmitted from a plurality of transmission antennas. $r_{QRD}(k)$ is a $(k+1)^{th}$ element of a decision statistics vector, and $s_{int}(k)$ is a $(k+1)^{th}$ element of an interference vector between signals.

Initial interference contaminated received signals determined in Equations 6, 7, 8, or 9 include the interference between the plurality of signals transmitted from the plurality of transmission antennas of the transmitter, and can have values different from the plurality of signals transmitted from the plurality of transmission antennas of the transmitter. Since the interference contaminated received signal can be inaccurate, a value of a received signal which is determined based on the interference contaminated received signal in Equation 13 can be inaccurate.

However, the received signal is a more accurate value than the interference contaminated received signal since the received signal is cancelled interference from among the plurality of signals being transmitted from the plurality of transmission antennas of the transmitter.

According to an embodiment of the present invention, the signal determination unit 240 updates the interference vector between signals based on the determined received signal $\tilde{s}_k$, performs a subtraction operation with respect to the decision statistics vector and the updated interference vector between signals, and re-determines the received signal.

The re-determined received signal has a more accurate value than the interference contaminated received signal since the re-determined received signal is determined based on an decreased interference contaminated received signal According to an embodiment of the present invention, the signal determination unit 240 can perform re-determining of the received signal at predetermined times after updating the interference vector between signals based on the re-determined received signal and performing the subtraction operation with respect to the decision statistics vector and the updated interference vector between signals. Through such repetition, the interference between the plurality of signals transmitted from the plurality of transmission antennas can be cancelled, and performance of the apparatus 150 for cancelling interferences can be improved.

Figure 3:
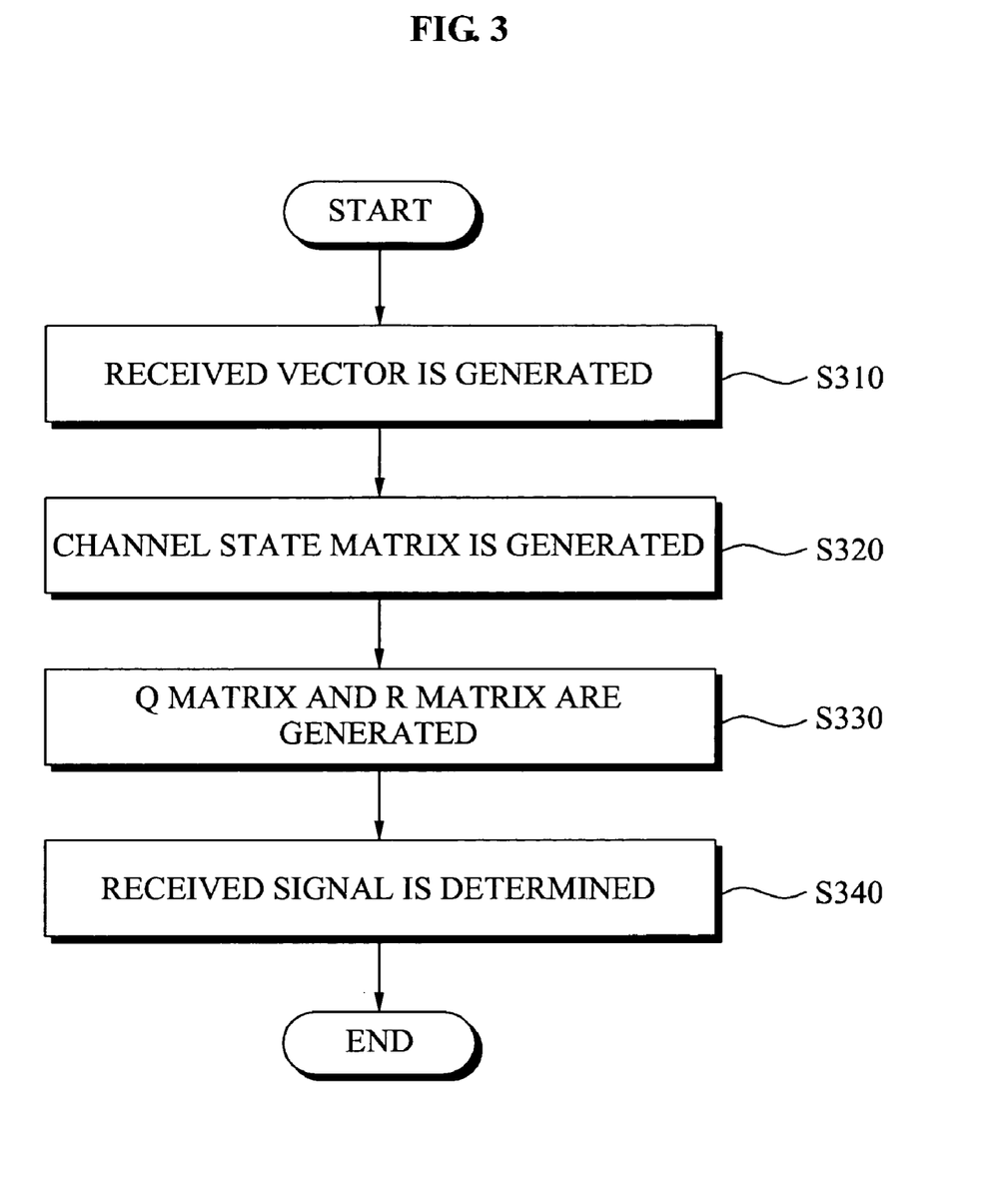
FIG. 3 is a flowchart illustrating a method for cancelling interferences between signals according to an example embodiment of the present invention.

FIG. 3 is a flowchart illustrating a method for cancelling interferences between signals according to an example embodiment of the present invention. Hereinafter, the method for cancelling interferences between signals according to the example embodiment of the present invention will be described in detail with reference to FIG. 3.

In operation S310, a received vector is generated after receiving an orthogonal coded signal. According to an embodiment of the present invention, a transmitter performs orthogonal space-time block coding with respect to a modulated signal and transmits the orthogonal space-time block coded signal to an apparatus for cancelling interferences between signals, and the apparatus for cancelling interferences between signals receives the orthogonal space-time block coded signal via a plurality of time durations and generates the received vector.

According to another example embodiment of the present invention, the transmitter performs orthogonal space-frequency block coding with respect to a modulated signal and transmits the orthogonal space-frequency coded signal to the apparatus for cancelling interferences between signals, and the apparatus for cancelling interferences between signals receives the orthogonal space-frequency coded signal via a plurality of frequency bands and generates the received vector.

In operation S320, a channel state matrix is generated after estimating a state of a wireless channel from the transmitter to the apparatus for cancelling interferences between signals. According to an embodiment of the present invention, the transmitter transmits a plurality of pilot signals being orthogonal with each other to a receiving unit using the plurality of transmission antennas, and the receiving unit generates the channel state matrix of the wireless channel from each of the plurality of transmission antennas to the receiving unit using the plurality of pilot signals being orthogonal with each other.

According to an embodiment of the present invention, the transmitter can have four transmission antennas and perform orthogonal space-time block using a $g_4$ code. The $g_4$ code is representative of an orthogonal space-time block code that can be used in the case of four transmission antennas. Hereinafter, it will be described that a transmitter performs orthogonal space-time block coding using the four transmission antennas and $g_4$ code. In this instance, a channel state matrix generated in operation S320 is determined as shown in Equation 14.

$$H = \begin{bmatrix} h_1(0) & h_2(0) & h_3(0) & h_4(0) \\ h_2(1) & -h_1(1) & h_4(1) & -h_3(1) \\ h_3(2) & -h_4(2) & -h_1(2) & h_2(2) \\ h_4(3) & h_3(3) & -h_2(3) & -h_1(3) \\ h_1^*(4) & h_2^*(4) & h_3^*(4) & h_4^*(4) \\ h_2^*(5) & -h_1^*(5) & h_4^*(5) & -h_3^*(5) \\ h_3^*(6) & -h_4^*(6) & -h_1^*(6) & h_2^*(6) \\ h_4^*(7) & h_3^*(7) & -h_2^*(7) & -h_1^*(7) \end{bmatrix},$$ [Equation 14]

where $h_k(n)$ indicates a state of a wireless channel from a $k^{th}$ transmission antenna of a transmitter in an $(n+1)^{th}$ time duration to the apparatus for cancelling interferences between signals. An $i^{th}$ column of Equation 14 indicates a state of a wireless channel when the signal from the transmitter passes through eight time durations, from an $i^{th}$ transmission antenna.

In operation S330, a Q matrix and an R matrix are generated by performing Q-R decomposition with respect to the generated channel state matrix. According to an embodiment of the present invention, the Q and R matrix are generated using a modified Gram-Schmidt orthogonalization process in operation S330.

In operation S340, a received signal is determined based on the generated Q matrix and a received vector. According to an embodiment of the present invention, a decision statistics vector is generated by multiplying a conjugate transpose matrix of the generated Q matrix by the received vector, and the received signal is determined based on the generated decision statistics vector. Operation S340 will be described in detail with reference to FIG. 4.

Figure 4:
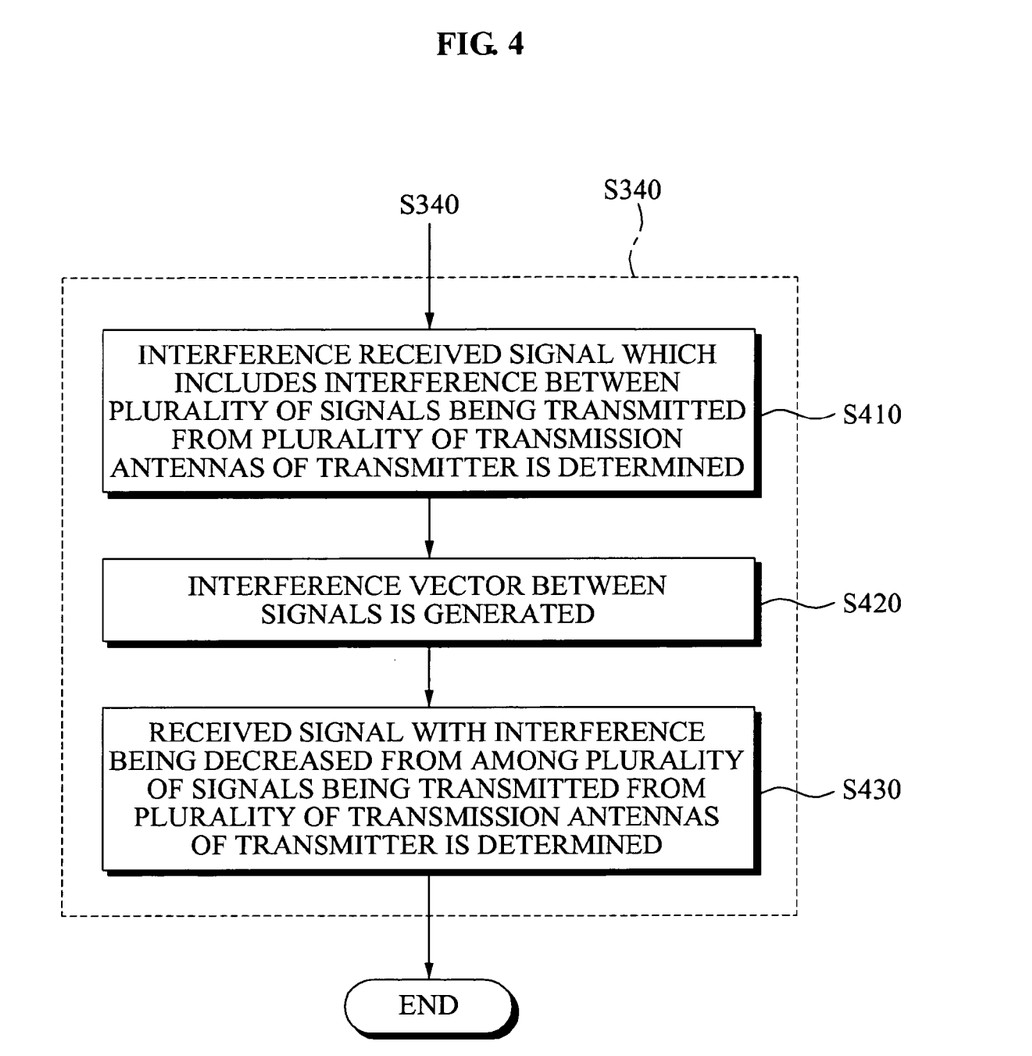
FIG. 4 is a flowchart illustrating a method for determining a received signal with interference being decreased from among a plurality of signals being transmitted from a plurality of transmission antennas of a transmitter according to an example embodiment of the present invention.

FIG. 4 is a flowchart illustrating a method for determining a received signal with interference being decreased from among a plurality of signals being transmitted from a plurality of transmission antennas of a transmitter according to an example embodiment of the present invention. Hereinafter, the method for determining the received signal with interference being decreased from among the plurality of signals being transmitted from the plurality of transmission antennas of the transmitter will be described in detail with reference to FIG. 4.

In operation S410, an interference contaminated received signal which includes interference between a plurality of signals being transmitted from a plurality of transmission antennas of the transmitter is determined based on a determined decision statistics vector. According to an embodiment of the present invention, the decision statistics vector is generated by multiplying a conjugate transpose matrix of the Q matrix being generated in operation S330 by the received vector, and the interference signal which includes interference between the plurality of signals being transmitted from the plurality of transmission antennas of the transmitter is determined based on the determined decision statistics vector.

According to an embodiment of the present invention, the decision statistics vector can be determined based on Equation 15.

$$r_{QRD} = Q^H \cdot r_{received},$$ [Equation 15]

where received is a $r_{received}$ vector, $r_{QRD}$ is a decision statistics vector, and $Q^H$ is a conjugate transpose matrix of a Q matrix.

According to an embodiment of the present invention, an interference contaminated received signal of a signal transmitted from a $4^{th}$ transmission antenna of the transmitter is determined based on Equation 16.

$$\hat{s}_3 = \underset{\bar{s} \in C}{\operatorname{argmin}} |r_{QRD}(3) - R_{44} \cdot \bar{s}|^2,$$ [Equation 16]

where $R_{44}$ is an element of a $4^{th}$ column of a $4^{th}$ row of an R matrix, and C is a set of all values $\bar{s}$ can have, for example, when a transmission signal is modulated using a BPSK modulation scheme, C={−1,1} is satisfied.

According to an embodiment of the present invention, each of interference contaminated received signals $\hat{s}_2$, $\hat{s}_1$, and $\hat{s}_0$ of signals transmitted from each of $3^{rd}$, $2^{nd}$, and $1^{st}$ transmission antenna is determined based on Equations 17, 18, and 19.

$$\hat{s}_2 = \underset{\bar{s} \in C}{\operatorname{argmin}} |r_{QRD}(2) - R_{34} \cdot \hat{s}_3 - R_{33} \cdot \bar{s}|^2,$$ [Equation 17]

where $R_{x,y}$ is an element of a $y^{th}$ column of an $x^{th}$ row of an R matrix.

$$\hat{s}_1 = \underset{\bar{s} \in C}{\operatorname{argmin}} |r_{QRD}(1) - R_{23} \cdot \hat{s}_2 - R_{24} \cdot \hat{s}_3 - R_{22} \cdot \bar{s}|^2$$ [Equation 18]

$$\hat{s}_0 = \underset{\bar{s} \in C}{\operatorname{argmin}} |r_{QRD}(0) - R_{12} \cdot \hat{s}_1 - R_{13} \cdot \hat{s}_2 - R_{14} \cdot \hat{s}_3 - R_{11} \cdot \bar{s}|^2$$ [Equation 19]

In operation S420, an interference vector between signals is generated based on the matrix with diagonal elements of the R matrix being deleted which is generated in operation S330 and the determined interference contaminated received signal which is determined in operation S410. According to an embodiment of the present invention, the interference vector between signals is generated by multiplying the matrix with diagonal elements of the R matrix being deleted by the determined interference contaminated received signal.

According to an embodiment of the present invention, the interference vector between signals can be determined based on Equation 20.

$$s_{int} = \Phi_{IE} \cdot \hat{s},\qquad \text{[Equation 20]}$$

where $s_{int}$ is an interference vector between signals, and $\Phi_{IE}$ is a matrix with diagonal elements of an R matrix being deleted and is determined as shown in Equation 21. $\hat{s}$ is a vector consisting of interference contaminated received signals $\hat{s}_0$, $\hat{s}_1$, $\hat{s}_2$, and $\hat{s}_3$ and is represented as shown in Equation 22.

$$\Phi_{IE} = \begin{bmatrix} 0 & R_{12} & R_{13} & R_{13} \\ 0 & 0 & R_{23} & R_{24} \\ 0 & 0 & 0 & R_{34} \\ 0 & 0 & 0 & 0 \end{bmatrix} \qquad \text{[Equation 21]}$$

$$\hat{s} = [\hat{s}_0\ \hat{s}_1\ \hat{s}_2\ \hat{s}_3]^T \qquad \text{[Equation 22]}$$

In operation S430, a received signal with interference being decreased from among the plurality of signals being transmitted from the plurality of transmission antennas of the transmitter is determined.

According to an embodiment of the present invention, the received signal is determined by performing subtraction operations with respect to the decision statistics vector and interference vector between signals based on Equation 23.

$$\tilde{s}_k = \underset{\tilde{s} \in C}{\operatorname{argmin}} |r_{QRD}(k) - s_{int}(k) - R_{k+1,k+1} \cdot \tilde{s}|^2, \qquad \text{[Equation 23]}$$

where $\tilde{s}_k$ is transmitted from a $(k+1)^{th}$ transmission antenna of a transmitter and is a received signal with interference being decreased from among a plurality of signals transmitted from a plurality of transmission antennas. $r_{QRD}(k)$ is a $(k+1)^{th}$ element of a decision statistics vector, and $s_{int}(k)$ is a $(k+1)^{th}$ element of an interference vector between signals.

In Equation 23, the received signal with interference being decreased from among the plurality of signals transmitted from the plurality of transmission antennas is determined. Since the interference is decreased from among the plurality of signals transmitted from the plurality of transmission antennas, the determined received signal is a more accurate value than the interference contaminated received signals being determined in Equations 16, 17, 18, and 19.

Figure 5:
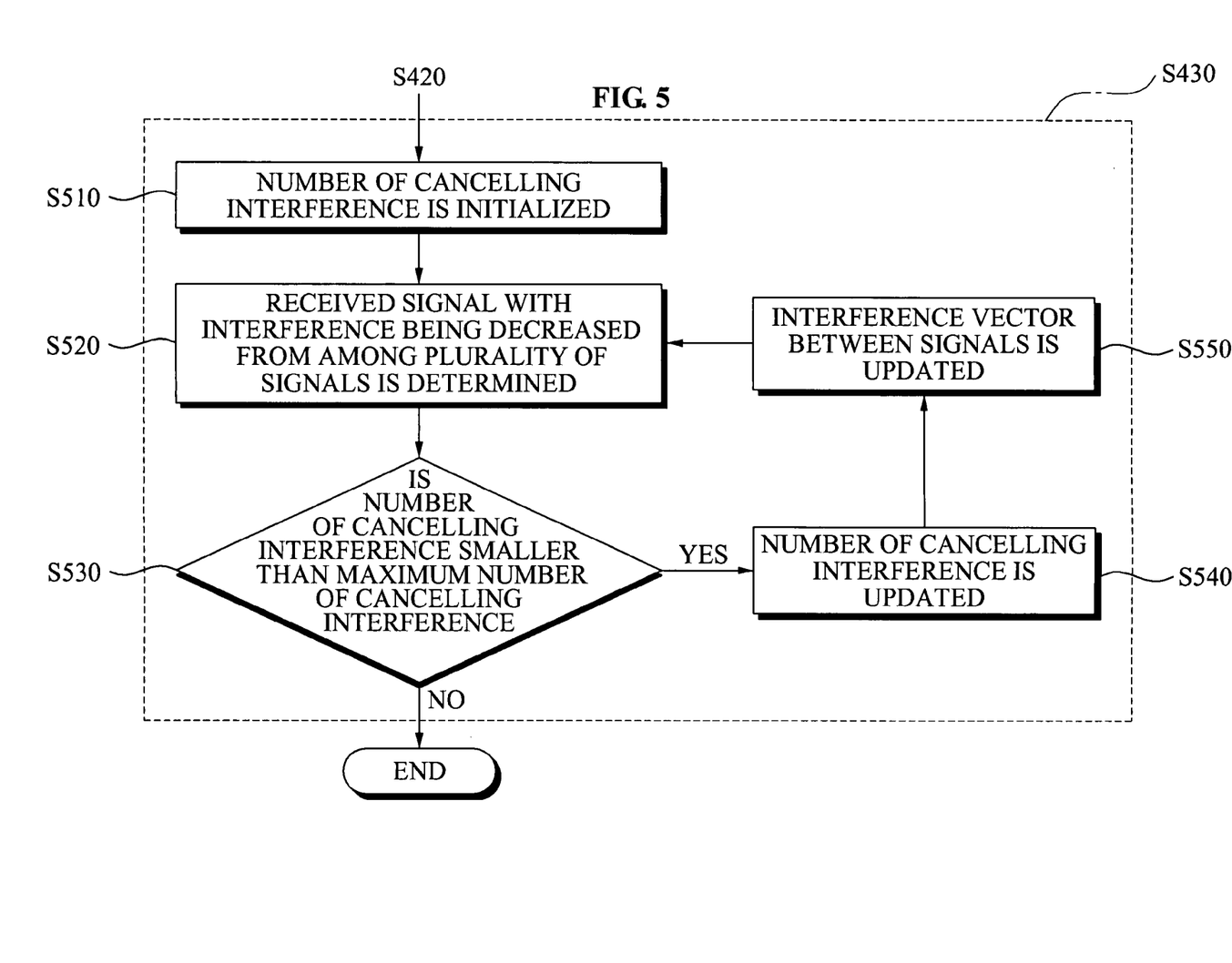
FIG. 5 is a flowchart illustrating a method for cancelling interferences between a plurality of signals being transmitted from a plurality of transmission antennas of a transmitter according to an example embodiment of the present invention.

FIG. 5 is a flowchart illustrating a method for sequentially cancelling interferences between a plurality of signals being transmitted from a plurality of transmission antennas of a transmitter according to an example embodiment of the present invention. Hereinafter, the method for sequentially cancelling interferences will be described in detail with reference to FIG. 5.

According to an embodiment of the present invention, in operations S430, an interference vector between signals is updated based on a determined received signal $\tilde{s}_k$, and the received signal can be re-determined by performing subtraction operations with respect to the decision statistics vector and interference vector between signals.

In operation S510, a number of cancelling interferences can be initialized. The number of the cancelling interferences indicates a number of updates that -interference vectors between signals based on a determined received signal, and the number of the cancelling interferences can be initialized to be '0' in operation S510 according to an embodiment of the present invention.

In operation S520, a received signal is determined based on Equation 23.

In operation S530, the number of the cancelling interferences is compared with a maximum number of cancelling interferences. According to an embodiment of the present invention, when the number of cancelling interferences is equal to or greater than the maximum number of cancelling interferences, an operation of the cancelling interferences can be terminated.

When the number of cancelling interferences is smaller than the maximum number of cancelling interferences, the number of cancelling interferences is updated in operation S540.

In operation S550, an interference vector between signals is updated based on the received signal being determined in operation S520. According to an embodiment of the present invention, in operation S550, the interference vector is updated based on Equation 24.

$$s_{int}^k = \Phi_{IE} \cdot \tilde{s}, \qquad \text{[Equation 24]}$$

where $\tilde{s}$ is determined in operation S520 and is a received signal with interference being decreased from among a plurality of signals being transmitted from a plurality of transmission antennas of a transmitter, and $s_{int}^k$ is an interference vector between signals being updated based on the determined received signal in operation S520, and k indicates a number of cancelling interferences.

Since the updated interference vector between signals is based on the received signal with interference being decreased, the updated interference vector between signals is a more accurate value than an interference vector between signals before updating.

According to an embodiment of the present invention, in operation S520, the received signal is re-determined by performing subtraction operations with respect to a decision statistics vector and updated interference vector between signals being updated in operation S550.

The received signal generated based on the updated interference vector between signals has a more accurate value than the received signal being generated based on the interference vector between signals before updating.

According to the present invention, performance of an apparatus for receiving signal from a transmitter can be improved by cancelling interferences between a plurality of signal transmitted from a plurality of transmission antennas of the transmitter.

The method for cancelling interferences between signals according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

While example embodiments have been particularly shown and described, it will be understood by those of ordinary skill in the art that various changes in form and details may be made therein without departing from the spirit and scope of the present invention as defined by the following claims.

What is claimed is:

1. An apparatus for cancelling interferences between signals, the apparatus comprising:
   a receiving unit that receives an orthogonal coded signal from a transmitter and generates a received vector;
   a channel estimation unit that estimates a state of a wireless channel from the transmitter to the apparatus where the cancelling of the interference between signals is performed and generates a channel state matrix;
   a Q-R decomposition unit that performs Q-R decomposition with respect to the generated channel state matrix and generates a Q matrix and an R matrix, and generates a decision statistic vector based on the generated Q matrix and the received vector; and
   a signal determination unit that determines a received signal with interference from the orthogonal coded signal being decreased based on the generated decision statistics vector,
      wherein the signal determination unit determines an interference contaminated received signal which includes interference between a plurality of signals being transmitted from a plurality of transmission antennas of the transmitter based on the determined decision statistics vector, and determines the received signal with interference being decreased from among the plurality of signals transmitted from the plurality of transmission antennas of the transmitter based on the determined interference contaminated received signal.

2. The apparatus of claim 1, wherein the orthogonal coded signal is a space-time block coded signal or a space-frequency block coded signal.

3. The apparatus of claim 1, wherein the signal determination unit multiplies a matrix with diagonal elements of the R matrix being deleted by the determined interference contaminated received signal and generates an interference vector between signals, performs subtraction operations with respect to the decision statistics vector and the generated interference vector between signals and determines the received signal.

4. The apparatus of claim 3, wherein the signal determination unit updates the interference vector between signals based on the determined received signal, performs a subtraction operation with respect to the decision statistics vector and the updated interference vector between signals and re-determines the received signal.

5. The apparatus of claim 1, wherein the signal determination unit determines the received signal based on $$\tilde{s}_k = \underset{\hat{s} \in C}{\arg\min} |r_{QRD}(k) - s_{int}(k) - R_{k+1,k+1} \cdot \hat{s}|^2,$$

where $\tilde{s}_k$ is a received signal being transmitted from a $(k+1)^{th}$ transmission antenna of a transmitter, $r_{QRD}$ is a decision statistic vector, $s_{int}$ is an interference vector between signals, and $R_{k+1,k+1}$ is a $k+1^{th}$ diagonal element of the R-matrix being generated by estimating a state of a wireless channel from a transmitter to an interference cancellation apparatus and performing Q-R decomposition with respect to the generated channel state matrix, wherein
   $r_{QRD}$ is determined based on $$r_{QRD} = Q^H \cdot r_{received},$$

where $r_{received}$ is a received vector which is generated by receiving a signal transmitted from a transmitter using a plurality of time durations or a plurality of frequency bands, and $Q^H$ is a conjugate transpose matrix of a Q matrix which is generated by estimating a state of a wireless channel from a transmitter to an interference apparatus and performing Q-R decomposition with respect to the generated channel state matrix, and
   $s_{int}$ is determined based on $$s_{int} = \Phi_{IE} \cdot \hat{s},$$

wherein $\Phi_{IE}$ is a matrix which is generated by cancelling diagonal elements of an R matrix, the R matrix being generated by performing Q-R decomposition with respect to a channel state matrix, and
   $\hat{s}$ is determined from $r_{QRD}$ and is an interference contaminated received signal which includes interferences between a plurality of signals being transmitted from a plurality of transmission antennas.

6. The apparatus of claim 1, wherein the channel estimation unit generates the channel state matrix based on a plurality of pilot signals being transmitted from each of the plurality of transmission antennas of the transmitter.

7. The apparatus of claim 1, wherein the Q-R decomposition unit multiplies a conjugate transpose matrix of the Q matrix by the received vector and generates the decision statistics vector.

8. The apparatus of claim 1, wherein the Q-R decomposition unit generates the Q-matrix and R-matrix using a modified Gram-Schmidt orthogonalization process.

9. A method for cancelling interferences between signals, the method comprising:
   receiving an orthogonal coded signal from a transmitter and generating a received vector;
   estimating a state of a wireless channel from the transmitter to the apparatus for cancelling interferences between signals and generating a channel state matrix;
   performing Q-R decomposition with respect to the generated channel state matrix and generating a Q matrix and an R matrix;
   generating a decision statistic vector based on the generated Q matrix and the received vector; and
   determining a received signal having decreased interference from the orthogonal coded signal based on the generated decision statistics vector, wherein the determining further includes,
      determining an interference contaminated received signal which includes interference between a plurality of signals being transmitted from a plurality of transmission antennas of the transmitter based on the determined decision statistics vector, and
      determining the decreased interference received signal from among the plurality of signals being transmitted from the plurality of transmission antennas of the transmitter based on the determined interference contaminated received signal.

10. The method of claim 9, wherein the orthogonal coded signal is an orthogonal time-space block coded signal or an orthogonal frequency-space block coded signal.

11. The method of claim 9, wherein the determining of the received signal having decreased interference between the plurality of signals being transmitted from the plurality of transmission antennas of the transmitter based on the determined interference contaminated received signal further comprises:

multiplying a matrix whose diagonal elements of the R matrix are being cancelled by the determined interference contaminated received signal and generating an interference vector between signals; and performing subtraction operations with respect to the decision statistics vector and the generated interference vector between signals and determining the received signal.

12. The method of claim 11, wherein the determining of the received signal having decreased interference between the plurality of signals being transmitted from the plurality of transmission antennas of the transmitter based on the determined interference contaminated received signal further comprises:

updating the interference vector between signals based on the determined received signal, and performs a subtraction operation with respect to the decision statistics vector and the updated interference vector between signals and re-determines the received signal.

13. The method of claim 9, wherein the determining of the received signal having decreased interference between the plurality of signals being transmitted from the plurality of transmission antennas of the transmitter based on the determined interference contaminated received signal determines the received signal based on, $$\tilde{s}_k = \mathrm{argmin}_{\tilde{s} \in C} |r_{QRD}(k) - s_{int}(k) - R_{k+1,k+1} \cdot \tilde{s}|^2,$$

wherein $\tilde{s}_k$ is a received signal transmitted from a k+1$^{th}$ transmission antenna of the transmitter, $r_{QRD}$ is a decision statistic vector, $s_{int}$ is an interference vector between signals, and $R_{k+1,k+1}$ is a k+1$^{th}$ diagonal element of the R-matrix being generated by estimating a state of a wireless channel from a transmitter to an interference cancellation apparatus and performing Q-R decomposition with respect to the generated channel state matrix, wherein $r_{QRD} = Q^H \cdot r_{received}$, wherein $r_{received}$ is a received vector which is generated by receiving a signal transmitted from a transmitter using a plurality of time durations or a plurality of frequency bands, and $Q^H$ is a conjugate transpose matrix of a Q matrix which is generated by estimating a state of a wireless channel from a transmitter to an interference apparatus and performing Q-R decomposition with respect to the generated channel state matrix; and $s_{int} = \Phi_{IE} \cdot \hat{s}$, wherein $\Phi_{IE}$ is a matrix which is generated by cancelling diagonal elements of an R matrix, the R matrix being generated by performing Q-R decomposition with respect to a channel state matrix, and $\hat{s}$ is determined from $r_{QRD}$ and is an interference contaminated received signal which includes interferences between a plurality of signals being transmitted from a plurality of transmission antennas.

14. The method of claim 9, wherein the generating of the channel state matrix generates the channel state matrix based on a plurality of pilot signals being transmitted from each of the plurality of transmission antennas of the transmitter.

15. The method of claim 9, wherein the generating of the decision statistics vector based on the generated Q matrix and the received vector generates the decision statistics vector by multiplying a conjugate transpose matrix of the Q matrix by the received vector.

16. The method of claim 9, wherein the generating of the Q and R matrixes generates the Q and R matrixes using a modified Gram-Schmidt orthogonalization process.

17. A computer-readable storage medium storing a program for implementing the method of claim 9.

* * * * *